(12) United States Patent
Jeong

(10) Patent No.: US 10,785,490 B2
(45) Date of Patent: Sep. 22, 2020

(54) VIDEO CODING MODULE AND METHOD OF OPERATING THE SAME

(71) Applicant: Samsung Electronics Co., Ltd., Suwon-si, Gyeonggi-do (KR)

(72) Inventor: Yowon Jeong, Anyang-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 130 days.

(21) Appl. No.: 15/844,584

(22) Filed: Dec. 17, 2017

(65) Prior Publication Data

US 2018/0220140 A1    Aug. 2, 2018

(30) Foreign Application Priority Data

Feb. 1, 2017    (KR) ........................ 10-2017-0014553

(51) Int. Cl.

| H04N 19/30 | (2014.01) |
| H04N 19/117 | (2014.01) |
| H04N 19/164 | (2014.01) |
| H04N 19/162 | (2014.01) |
| H04N 19/179 | (2014.01) |
| H04N 19/103 | (2014.01) |
| H04N 19/176 | (2014.01) |
| H04N 19/124 | (2014.01) |
| H04N 19/136 | (2014.01) |

(52) U.S. Cl.
CPC .......... *H04N 19/30* (2014.11); *H04N 19/103* (2014.11); *H04N 19/117* (2014.11); *H04N 19/162* (2014.11); *H04N 19/164* (2014.11); *H04N 19/179* (2014.11); *H04N 19/124* (2014.11); *H04N 19/136* (2014.11); *H04N 19/176* (2014.11)

(58) Field of Classification Search
CPC .... H04N 19/30; H04N 19/103; H04N 19/117; H04N 19/162; H04N 19/164; H04N 19/179
USPC ..................................................... 375/240.01
See application file for complete search history.

(56) References Cited

U.S. PATENT DOCUMENTS

| 5,847,766 | A | 12/1998 | Peak |
| 6,075,884 | A | 6/2000 | Lubin et al. |
| 6,295,375 | B1 | 9/2001 | Andry |
| 6,782,135 | B1 | 8/2004 | Viscito et al. |
| 8,737,464 | B1 | 5/2014 | Zhang et al. |
| 9,313,526 | B2 | 4/2016 | Bivolarsky et al. |
| 2003/0058934 | A1* | 3/2003 | Koto .................. H04N 21/2187 375/240.01 |
| 2012/0044990 | A1 | 2/2012 | Bivolarsky et al. |
| 2013/0222645 | A1* | 8/2013 | Bilcu ..................... G06T 9/00 348/239 |
| 2014/0254928 | A1* | 9/2014 | Tsai ..................... H04N 19/117 382/166 |

(Continued)

*Primary Examiner* — Nguyen T Truong
(74) *Attorney, Agent, or Firm* — Renaissance IP Law Group LLP

(57) ABSTRACT

A training operation is performed on the video coding module to generate a personal video parameter based on information on a sensitivity of a user and a preference of a user. An image is received through an imaging device. The image is encoded based on the personal video parameter to generate an encoded image. The encoded image is decoded based on the personal video parameter to generate a first decoded image.

13 Claims, 14 Drawing Sheets

(56) References Cited

U.S. PATENT DOCUMENTS

2015/0304685 A1\* 10/2015 Vanam ................. H04N 19/117
                                                         375/240.29
2016/0073111 A1   3/2016 Lee et al.
2016/0142705 A1\* 5/2016 Fan ...................... H04N 19/593
                                                         375/240.13

\* cited by examiner

VIDEO CODING MODULE AND METHOD OF OPERATING THE SAME

CROSS-REFERENCE TO RELATED APPLICATION

This application claims priority under 35 U.S.C. § 119 to Korean Patent Application No. 10-2017-0014553, filed on Feb. 1, 2017 in the Korean Intellectual Property Office, the disclosure of which is incorporated by reference herein in its entirety.

TECHNICAL FIELD

The present inventive concept relates to a video coding module and a method of operating the same.

DISCUSSION OF RELATED ART

Various image processing techniques are used in personal image devices such as a smart phone, a tablet PC, and a digital camera. For example, a perceptual video coding (PVC) method may operate based on a human vision system (HVS) model for a hypothetical average user.

SUMMARY

According to an exemplary embodiment of the present inventive concept, an operation method of a video coding module is provided as follows. A training operation is performed on the video coding module to generate a personal video parameter based on information about a sensitivity of a user and a preference of a user. An image is received through an imaging device. The image is encoded based on the personal video parameter to generate an encoded image. The encoded image is decoded based on the personal video parameter to generate a first decoded image.

According to an exemplary embodiment of the present inventive concept, a video coding module is provided as follows. A training unit collects information about a sensitivity of a user and a preference of a user and generates a personal video parameter based on the sensitivity information and the preference information. An imaging device generates an image. A video encoder encodes the image based on the personal video parameter and generates an encoded image. A video decoder decodes the encoded image and generates a decoded image from the encoded image based on the personal video parameter.

According to an exemplary embodiment of the present inventive concept, an operation method of a video coding module is provided as follows. A value of a parameter of a preset image is gradually changed to generate a plurality of test images. Each of the plurality of test images has a value of the parameter different from the value of the parameter of the preset image. The preset image and each of the plurality of test images are sequentially displayed. Feedback is received with respect to the plurality of test images. A personal video parameter is generated based on the feedback. An image is received through an imaging device. The image is encoded based on the personal video parameter to generate an encoded image.

BRIEF DESCRIPTION OF DRAWINGS

These and other features of the present inventive concept will become more apparent by describing in detail exemplary embodiments thereof with reference to the accompanying drawings of which.

DETAILED DESCRIPTION OF EXEMPLARY EMBODIMENTS

Figure 1:
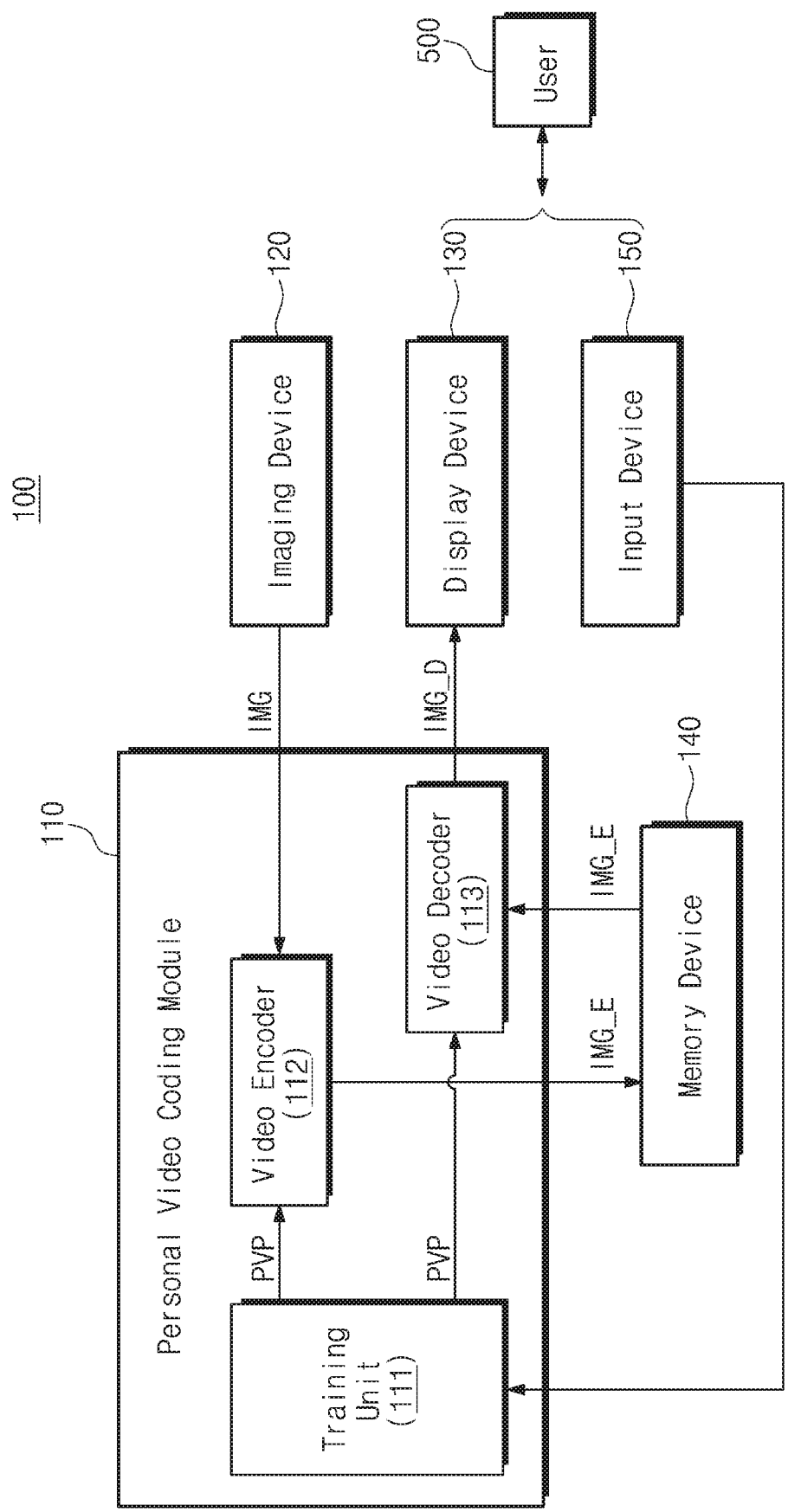
FIG. 1 is a block diagram illustrating a user device according to an exemplary embodiment of the present inventive concept.

Exemplary embodiments of the present inventive concept will be described below in detail with reference to the accompanying drawings. Like reference numerals may refer to the like elements throughout the specification and drawings.

FIG. 1 is a block diagram illustrating a user device according to an exemplary embodiment of the present inventive concept. Referring to FIG. 1, a user device 100 may include a personal video coding module 110, an imaging device 120, a display device 130, a memory device 140, and an input device 150. The user device 100 may be a personal terminal such as a personal computer, a notebook PC, a tablet PC, a smart phone, etc.

The personal video coding module 110 may encode an image IMG from the imaging device 120 to generate an encoded image IMG_E and may decode the encoded image IMG_E to generate a decoded image IMG_D. The image IMG may be an image file such as a video file and a picture file. The personal video coding module 110 may include a training unit 111, a video encoder 112, and a video decoder 113.

The training unit 111 may perform a training operation on the user device 100 through a communication with a user 500 to generate a personal video parameter PVP. For example, the training unit 111 may perform the training operation on the personal video coding module 110 of the user device 100. In the training operation, the training unit 111 may collect a parameter and its parameter value that are responded by the user 500, which will be set to the personal video parameter PVP. For example, the personal video parameter PVP may include a parameter and its value. The parameter is a parameter with respect to the image IMG and may include clarity, luminance, color contrast, a color temperature, color saturation, a bit rate, resolution, or a frame rate of an image. The personal video parameter PVP may include at least one of the parameter responded by the user 500 in the training operation performed by the training unit 111. In the training operation with the user 500, the training unit 111 may collect an image or an image information to which the user 500 responds and may generate a personal video parameter PVP based on the image or the image information. In an exemplary embodiment, a term of "user", "individual user", or "personal user" may indicate a human using a device or a terminal, including the video coding module.

The training operation performed by the training unit 111 may include a sensitivity training operation (hereinafter it is referred to as 'sensitivity training') and a preference training operation (hereinafter it is referred to as 'preference training'). The sensitivity training may include an operation for determining a parameter and its value to which the user 500 may respond in the training operation. The preference training may include an operation for determining an image type or an image information to which the user 500 responds.

The training unit 111 may perform at least one of the sensitivity training and the preference training through the display device 130 and the input device 150. The input device 150 may include one or more of a touch screen, a mouse, a keyboard, and a voice sensor. If the input device 150 is a touch screen, the input device 150 may be part of the display device 130. The sensitivity training and the preference training of the training unit 111 will be described in detail with reference to FIGS. 3 to 7.

The video encoder 112 may encode an image IMG received from the imaging device 120 to generate an encoded image IMG_E. For example, the video encoder 112 may encode the image IMG according to a predetermined video coding algorithm. The predetermined video coding algorithm may include a video coding algorithm such as a perceptual video coding (PVC), H. 261, H. 262, H. 263, H.264/MPEG-4 AVC (advanced video coding), H265, a multi-view video coding, and a SVC (scalable video coding), but the inventive concept is not limited thereto.

The video encoder 112 may encode the image IMG using the personal video parameter PVP from the training unit 111. The encoded image IMG_E by the video encoder 112 may be an image into which the sensitivities and the preferences of the user 500 are reflected. The encoded image IMG_E may be stored in the memory device 140. The present inventive concept is not limited thereto. For example, unlike FIG. 1, an encoded image may be stored in an external storage server connected through a communication network.

The video decoder 113 may decode the encoded image IMG_E to generate the decoded image IMG_D. For example, the video decoder 113 may decode the encoded image IMG_E according to the predetermined video coding algorithm. Since the predetermined video coding algorithm was described before, a detailed description thereof is omitted.

The video decoder 113 may decode the encoded image IMG_E using the personal video parameter PVP received from the training unit 111. The decoded image IMG_D from the video decoder 113 may be an image into which the sensitivities and the preferences of the user 500 are reflected. The decoded image IMG_D may be provided to the display device 130 configured to output the decoded image IMG_D. The encoded image IMG_E may be provided from the memory device 140 to the video decoder 113. The present inventive concept is not limited thereto. For example, unlike FIG. 1, an image may be provided from an external storage server to the video decoder 113 through a wired or wireless communication network.

Although not illustrated in the drawing, the image IMG from the imaging device 120 may be first stored in the memory device 140 or in a separate memory, such as a static random-access memory (SRAM) or a dynamic random-access memory (DRAM), and then may be provided to the video encoder 112. The decoded image IMG_D from the video decoder 113 may be first stored in the memory device 140 or in a separate memory (e.g., SRAM, DRAM, etc.) and then may be provided to the display device 130.

The imaging device 120 may be a camera device including various types of image sensors to obtain the image IMG. The display device 130 may be a device to output the decoded image IMG_D to the external. The user 500 may look at the outputted decoded image IMG_D through the display device 130.

The memory device 140 may be a buffer memory, a cache memory, or an operation memory of the user device 100. The memory device 140 may be used as large-capacity storage medium. The memory device 140 may include a volatile memory device such as a SRAM, a DRAM, a SDRAM (synchronous DRAM), etc., or a nonvolatile memory device such as a ROM (read only memory), a PROM (programmable ROM), an EPROM (electrically programmable ROM), an EEPROM (electrically erasable and programmable ROM), a flash memory, a PRAM (phase change RAM), a MRAM (magnetic RAM), a RRAM (resistive RAM), a FRAM (ferroelectric RAM), etc.

A part or all of the personal video coding module 110 may be provided in the form of a hardware, a software, or a combination thereof. For example, the software may include machine code, firmware, an embedded code, or an application software. The hardware may include a processor, a computer, an integrated circuit, an integrated circuit core, a pressure sensor, an inertial sensor, a MEMS (microelectromechanical system), a passive device, or a combination thereof. A part or all of the personal video coding module 110 may be included in a central processing unit (CPU) or an application processor (AP) of the user device 100 and may be provided in the form of a reusable IP (intellectual property) core.

As described above, the personal video coding module 110 may generate the personal video parameter PVP by performing the training operation with the user 500 and may control the video encoder 112 and the video decoder 113 using the personal video parameter PVP. Thus, since the personal video coding module 110 learns the sensitivities and the preferences of the user 500, the user device 100 may provide an optimized image to the user 500 for an increased user experience.

Figure 2:
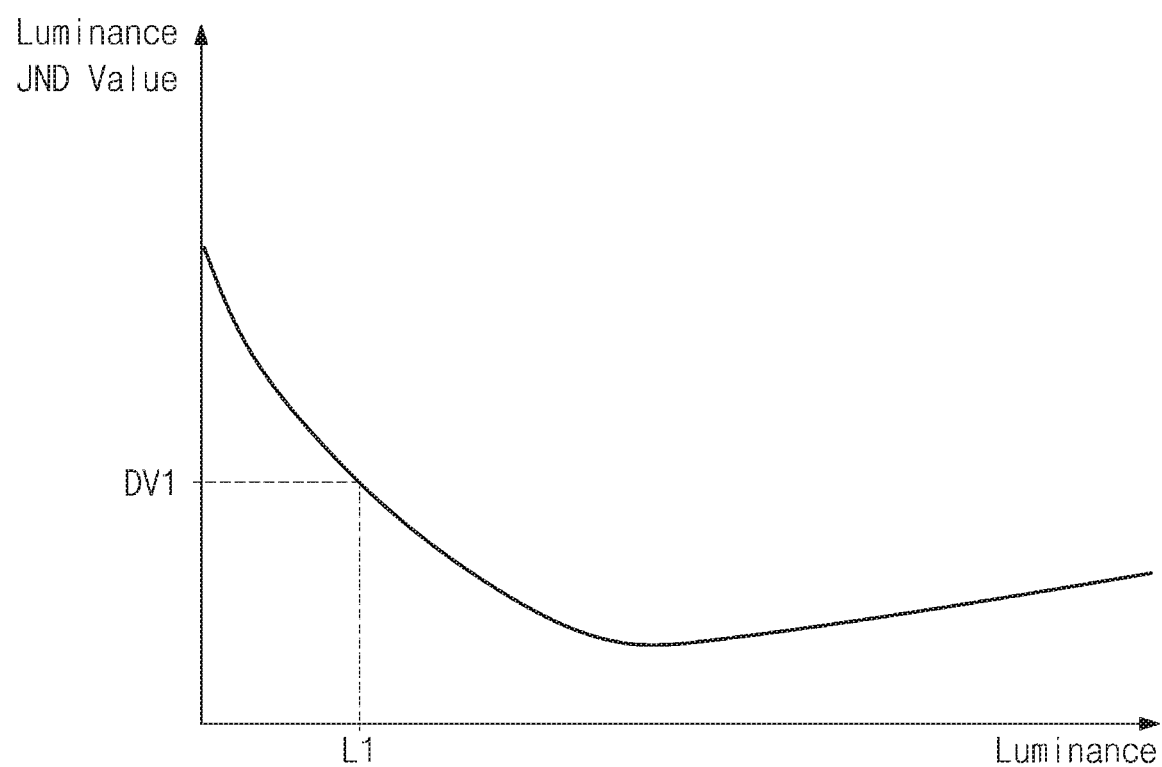
FIG. 2 is a graph illustrating a human vision system (HVS) model used in a video encoder or a video decoder.

FIG. 2 is a graph illustrating a human vision system (HVS) model used in a video encoder or a video decoder. An X axis indicates luminance of an image and a Y axis indicates a luminance just-noticeable difference (JND) value.

Referring to FIGS. 1 and 2, the video encoder 112 and the video decoder 113 may perform an encoding operation and a decoding operation based on the human vision system (HVS) model. The HVS model may provide a model for processing an image based on sensitivity information about an image of each of a plurality of users. For example, after measuring the JND with respect to each user, the conventional HVS model is modeled based on an average value of the measured JND. Since the conventional HVS model is made based on an average value of sensitivity of a plurality of users, the conventional HVS model does not reflect optimized sensitivity or preference of each individual user. The conventional HVS model may be referred to as an average HVS model.

For example, the conventional HVS may be modeled like the graph illustrated in FIG. 2. According to the conventional HVS model illustrated in FIG. 2, if luminance of the image IMG changes as much as a first difference DV1 at a first luminance L1, some users may respond to a luminance change of the image IMG. However, other users may respond to a change greater or smaller than the first difference DV1 at the first luminance L1.

Thus, the conventional HVS model based on an average value of sensitivity of a plurality of users does not reflect the sensitivities and the preferences of an individual user or a personal user who is an exception to the conventional HVS model. The personal video coding module 110 of FIG. 1 may learn sensitivity information and preference information of the user 500 through the training operation with the personal user and operate the video encoder 112 and the video decoder 113 based on, or using, the sensitivity information and the preference information of the user 500.

Figure 3:
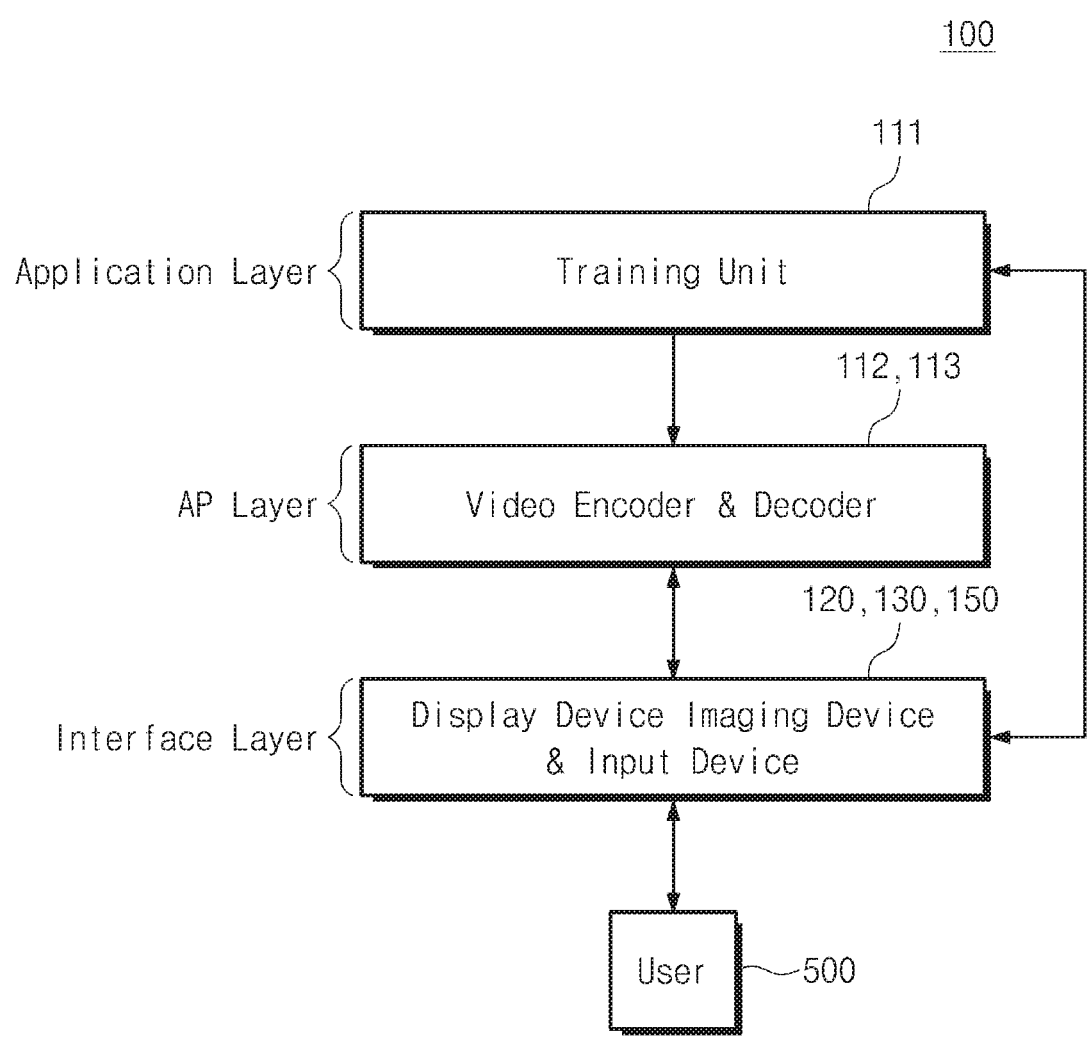
FIG. 3 is a block diagram illustrating a layer of a user device of FIG. 1 according to an exemplary embodiment of the present inventive concept.

FIG. 3 is a block diagram illustrating a layer of a user device of FIG. 1. For brevity of drawing and convenience of description, configurations which are not needed to describe a layer of the user device 100 are omitted. The layers illustrated in FIG. 3 are only examples and the scope of the inventive concept is not limited thereto.

Referring to FIGS. 1 and 3, the user device 100 may include the training unit 111, the video encoder 112, the video decoder 113, the imaging device 120, the display device 130 and the input device 150.

As illustrated in FIG. 3, the training unit 111 may be embodied in an application layer. For example, the training unit 111 may be an application installed in the user device 100 in advance, for example, by a manufacturer. The present inventive concept is not limited thereto. For example, the training unit 111 may be an application installed in the user device 100 by a user.

The video encoder 112 and the video decoder 113 may be embodied in an application processor (AP) layer. For example, the video encoder 112 and the video decoder 113 may be embodied in the form of a re-usable intellectual property (IP) to be integrated into the application processor. The present inventive concept is not limited thereto. For example, the video encoder 112 and the video decoder 113 may be customized or newly designed.

The imaging device 120, the display device 130, and the input device 150 may be embodied in an interface layer to communicate with other constituent elements. The imaging device 120, the display device 130, and the input device 150 may be controlled by other functional blocks in the AP layer.

As illustrated in FIG. 3, the training unit 111 may perform the training operation with the user 500 through the imaging device 120, the display device 130, and the input device 150. Although not clearly illustrated in the drawing, the training unit 111 may be configured to control the imaging device 120, the display device 130, and the input device 150 through other functional blocks of the application layer.

The training unit 111 may generate the personal video parameter PVP based on a training result. The video encoder 112 may encode the image IMG received from the imaging device 120 based on the personal video parameter PVP to output the encoded image IMG_E, and the video decoder 113 may decode the encoded image IMG_E based on the personal video parameter PVP to output the decoded image IMG_D through the display device 130.

The present inventive concept is not limited thereto. For example, each of constituent elements of the user device 100 may be provided in the form of software, hardware, or a combination thereof and may be embodied in the form of an application layer, a processor layer, or a hardware layer.

Figure 4:
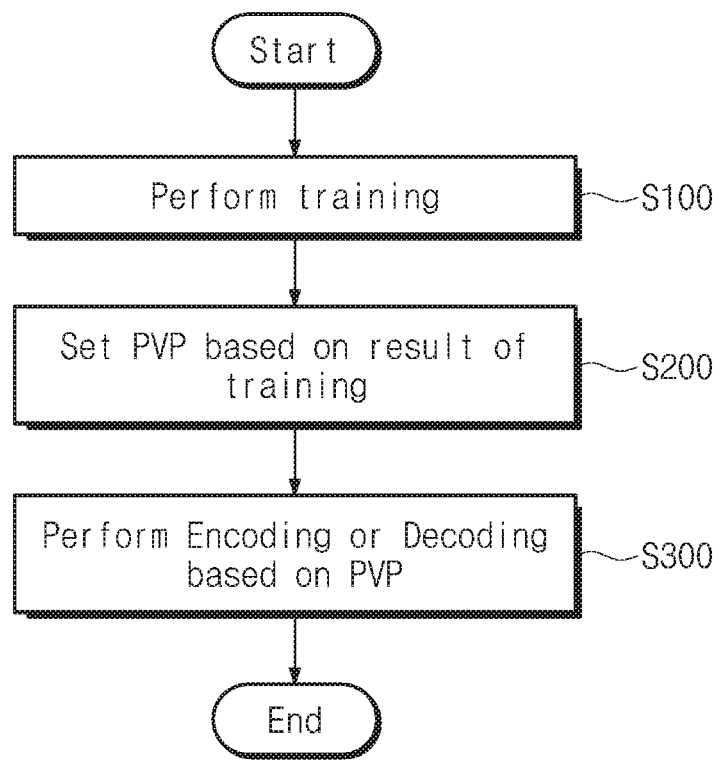
FIG. 4 is a flowchart illustrating an operation of a personal video coding module of FIG. 1 according to an exemplary embodiment of the present inventive concept.

FIG. 4 is a flowchart illustrating an operation of a personal video coding module of FIG. 1. Referring to FIGS. 1 and 4, in operation S100, the personal video coding module 110 may perform a training operation with the user 500. For example, the personal video coding module 110 may perform a sensitivity training and a preference training with the user 500. The sensitivity training and the preference training will be described in further detail with reference to FIGS. 5 through 7.

In operation S200, the personal video coding module 110 may generate the personal video parameter PVP based on a result of the training operation. As described above, the personal video coding module 110 may collect values of parameters to which the user 500 responds and may collect a preference image or image information through a preference training operation. The personal video coding module 110 may generate the personal video parameter PVP based on a result of the training operation. The personal video parameter PVP may include luminance, color contrast, a color temperature, color saturation, a bit rate, resolution, or a frame rate of an image which a user responds to or prefers in the training operation.

In operation S300, the personal video coding module 110 may perform an encoding operation or a decoding operation based on the personal video parameter PVP generated in the step S200. As described above, the image encoded or decoded based on the personal video parameter PVP may be an image processed based on the sensitivity information and preference information of the user 500. The sensitivity information may include a parameter or a parameter value to which the user responds in the sensitivity training. The preference information may include information of an image which the user prefers in the preference training. The sensitivity information may include, for example, luminance, contrast, light, or shade of which a change the user 500 may respond in the sensitivity training. The preference information may include, for example, image quality, resolution, clarity, a frame rate, or a bit rate of a selected image in the preference training. However, the present inventive concept is not limited thereto. For example, the sensitivity information and the preference information may be variously changed.

Figure 5:
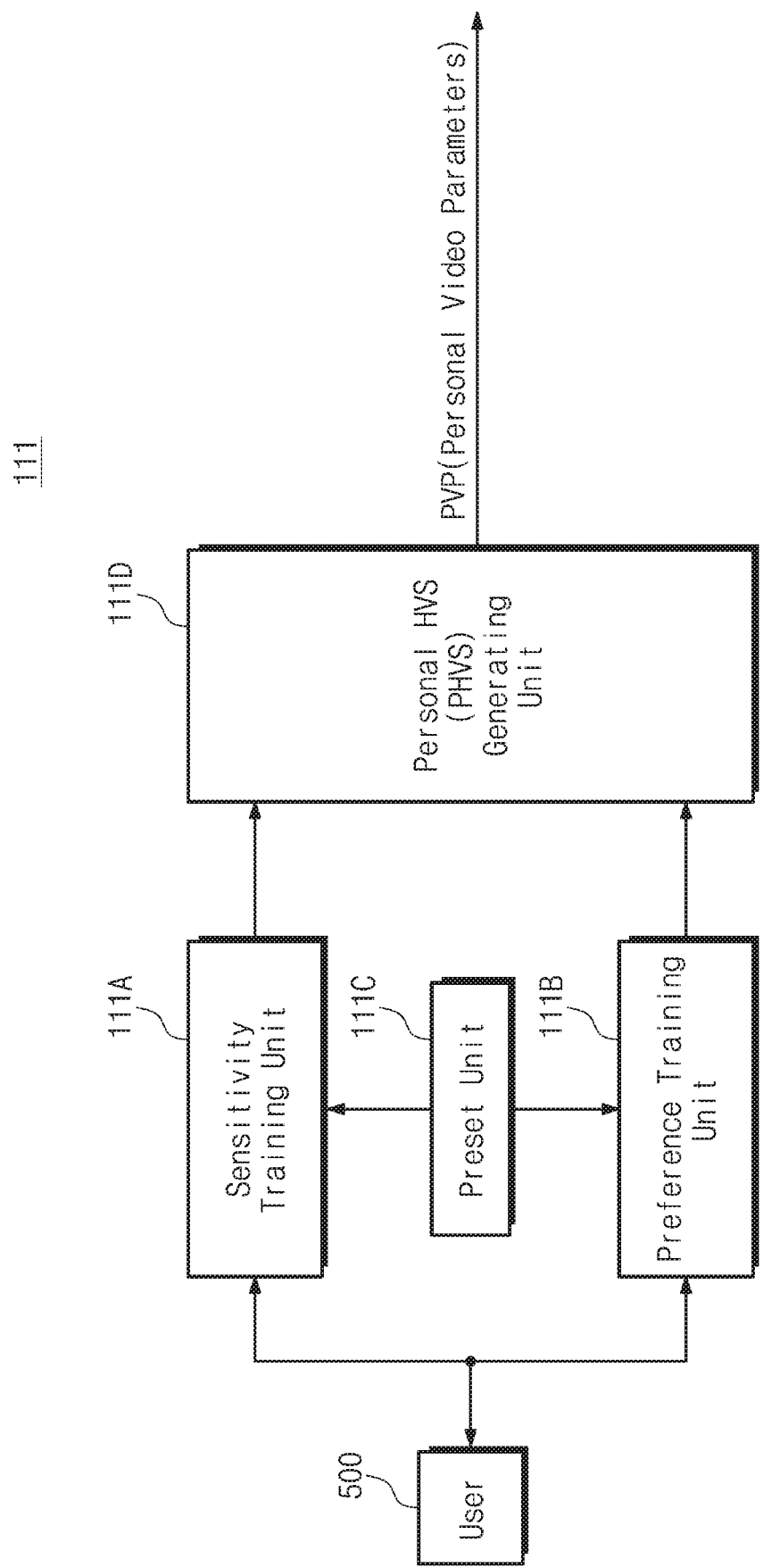
FIG. 5 is a block diagram illustrating a training unit of FIG. 1 according to an exemplary embodiment of the present inventive concept.

FIG. 5 is a block diagram illustrating a training unit of FIG. 1. For brevity of drawing and convenience of description, configurations which are not needed to describe the training unit 111 are omitted. As described above, the training unit 111 may perform a training operation with the user 500 through the display device 130 and the input device 150.

Referring to FIGS. 1 and 5, the training unit 111 may include a sensitivity training unit 111A, a preference training unit 111B, a preset unit 111C, and a PHVS generating unit 111D. The term of "PHVS" is short for "personal human vision system."

The sensitivity training unit 111A may be configured to perform a sensitivity training with the user 500. For example, the sensitivity training unit 111A may select one of a plurality of parameters and may gradually change a value of the selected parameter. An image to which the changed parameter value is applied may be provided to the user 500 through the display device 130. The user 500 may provide feedback to the sensitivity training unit 111A based on the image provided through the display device 130. In an exemplary embodiment, the image may be provided to the user 500 for a predetermined time, and if the user 500 does not respond for the predetermined time, the sensitivity training unit 111A will register no feedback from the user 500 and may continue to change the value of the selected parameter. If the user 500 does not respond to any value of the selected parameter, the user 500 may be insensitive to the selected parameter. In this case, the user device 100 does not need to adjust an image with respect to the selected parameter in the encoding operation and the decoding operation. The feedback may include information about a value at which the user may respond to a change of between the current parameter value and its previous parameter value for the selected parameter. The feedback may also include information about a parameter value to which the user responds to.

For example, the sensitivity training unit 111A may select luminance as a parameter to be trained. The sensitivity training unit 111A may gradually increase or decrease luminance of the image IMG being output to the display device 130. In response to a luminance change in the image IMG provided through the display device 130, the sensitivity training unit 111A may receive feedback from the user 500. The sensitivity training unit 111A may provide information about a luminance level response by the user 500 to the PHVS generating unit 111D in response to the feedback from the user 500. The sensitivity training unit 111A may repeatedly perform the sensitivity training on each of the plurality of parameters. In an exemplary embodiment, a parameter value of a parameter to be trained may be changed stepwise. The amount of a change in the parameter value may be set to a predetermined amount.

The preference training unit 111B may be configured to perform a preference training with the user 500. For example, the preference training unit 111B may provide at least two images among predetermined images to the user 500 through the display device 130. The user 500 may select one image of the at least two images provided through the display device 130 and may provide feedback with respect to the selected image to the preference training unit 111B. The preference training unit 111B may select one image from the at least two images in response to the feedback from the user 500.

After that, the preference training unit 111B may provide at least one of the remaining images and the previously selected image to the user and may receive feedback from the user 500 again. The preference training unit 111B may perform this comparison operation until all predetermined images stored in the preset unit 111C are compared. After repeated comparison operations, the preference training unit 111B may select one image among predetermined images and may provide information about the selected image to the PHVS generating unit 111D. The preference training unit 111B may combine information about images selected in the repeated comparison operation described above and provide the combined information to the PHVS generating unit 111D.

The sensitivity training unit 111A and the preference training unit 111B may perform sensitivity training and preference training based on the information stored in the preset unit 111C. The preset unit 111C may include preset information about a starting parameter of the sensitivity training and the preference training, a start value of the parameter, an amount of change of the parameter, or predetermined images.

The preset unit 111C may store a value predetermined by the conventional HVS model as discussed above. The preset unit 111C may include a preset information different depending on an operation environment, an operation region, etc. of the user device 100. According to an exemplary embodiment, the preset unit 111C may store different information depending on personal information (e.g., age, sex, race of a user).

The PHVS generating unit 111D may receive training results from each of the sensitivity training unit 111A and the preference training unit 111B and may generate a personal video parameter PVP based on the received training results. For example, the PHVS generating unit 111D may set a PHVS model based on the received training results. The PHVS model may be, unlike the conventional HVS model described with reference to FIG. 2, modeled based on the information collected from the user 500 who becomes a target of the training operation. The conventional HVS model of FIG. 2 is modeled based on an average value of information collected from multiple users. While the PHVS model may be set based on personal sensitivity and personal preference of each user. The personal video parameter PVP may be set from the PHVS model. The personal video parameter PVP may be provided to the video encoder 112 and the video decoder 113.

In an exemplary embodiment, the PHVS generating unit 111D may set the PHVS model for the user 500 based on the training result that the sensitivity training unit 111A generates. In an exemplary embodiment, the PHVS generating unit 111D may set the PHVS model for the user 500 based on the training result that the preference training unit 111B generates. In an exemplary embodiment, the PHVS generating unit 111D may set the PHVS model for the user 500 based on the training results that both the sensitivity training unit 111A and the preference training unit 111B generate.

The PHVS generating unit 111D may be configured to learn training results through a machine learning process.

Figure 6:
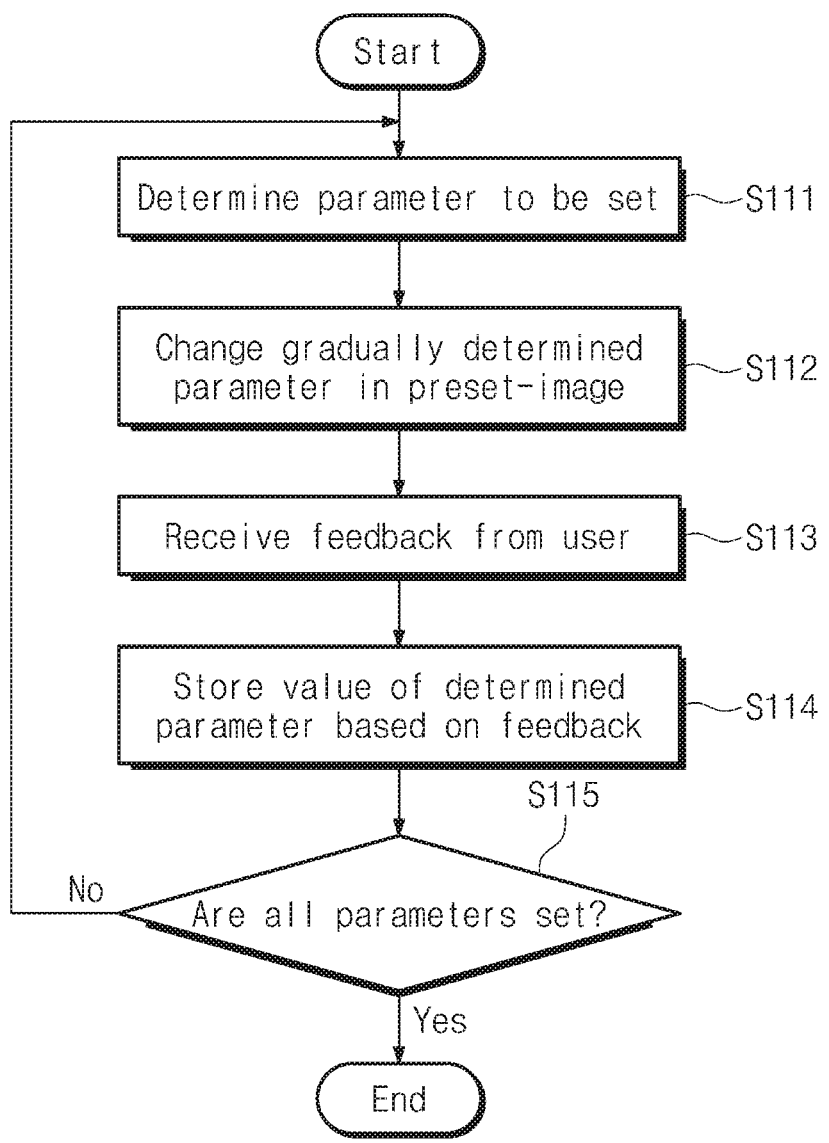
FIG. 6 is a flowchart illustrating a sensitivity training of a sensitivity training unit of FIG. 5 according to an exemplary embodiment of the present inventive concept.

FIG. 6 is a flowchart illustrating a sensitivity training of the sensitivity training unit of FIG. 5. The sensitivity training of operations S111 to S115 may be included in the operation of S100 of FIG. 4.

Referring to FIGS. 1, 5 and 6, in operation of S111, the sensitivity training unit 111A may determine a parameter to be set. For example, the sensitivity training unit 111A may determine a parameter to be set through a sensitivity training among a plurality of parameters associated with the image IMG. The sensitivity training unit 111A may determine a parameter based on the preset information stored in the preset unit 111C. The plurality of parameters may include luminance, color contrast, a color temperature, color saturation, a bit rate, etc. of the image IMG. For the convenience of a description, it is assumed that luminance of the image IMG is selected as the parameter to be set in the following operations.

In operation S112, the sensitivity training unit 111A may gradually change a value of the determined parameter of a preset image stored in the preset unit 111C. For example, the sensitivity training unit 111A may gradually increase or decrease luminance of the preset image and output a plurality of test images with the changed value of the determined parameter to the display device 130. For example, each of the plurality of test images may be a modified preset image with a value of the determined parameter different from the value of the determined parameter of the preset image. The preset image may be determined according to preset information.

In operation S113, the sensitivity training unit 111A may receive feedback from the user 500. For example, the user may detect a luminance change in the image output through the display device 130 and may provide feedback with respect to information about the detected luminance change to the sensitivity training unit 111A. The feedback may be provided through the input device 150.

In operation S114, the sensitivity training unit 111A may store a parameter value determined based on the feedback. For example, as described above, the feedback may include the information about the detected luminance change. The sensitivity training unit 111A may determine a luminance value based on the feedback and may store the determined luminance value in a separate storage circuit (not shown) such as SRAM, a DRAM, or a register. The determined luminance value may be provided to the PHVS generating unit 111D.

In operation S115, the sensitivity training unit 111A may determine whether all parameters are set. The sensitivity training unit 111A may perform the sensitivity training with respect to each of the plurality of parameters. In the case where all parameters are not set, the sensitivity training unit 111A may repeatedly perform the operations of S111 to S115 to perform the sensitivity training with respect to each of parameters which are not set. In the case where all parameters are set, the sensitivity training unit 111A may finish the sensitivity training.

Information about the parameters which are set or the parameter values which are set may be provided to the PHVS generating unit 111D.

The sensitivity training may be performed with respect to each of the plurality of users. The parameters which are set or information about the parameters for each of the plurality of users may be stored in the memory device 140 or in a separate storage device. In the case where the user changes, the stored information may be automatically or manually loaded again, and thereby may be used in a video coding without an additional sensitivity training.

The sensitivity training may be performed in each of various operation environments (e.g., indoor, outdoor, day, night, etc.). The parameters which are set or information about the parameters may be stored in the memory device 140 or in a separate storage device. In the case where the operation environment changes, the stored information may be automatically or manually loaded again, and thereby may be used in a video coding without an additional sensitivity training.

Figure 7:
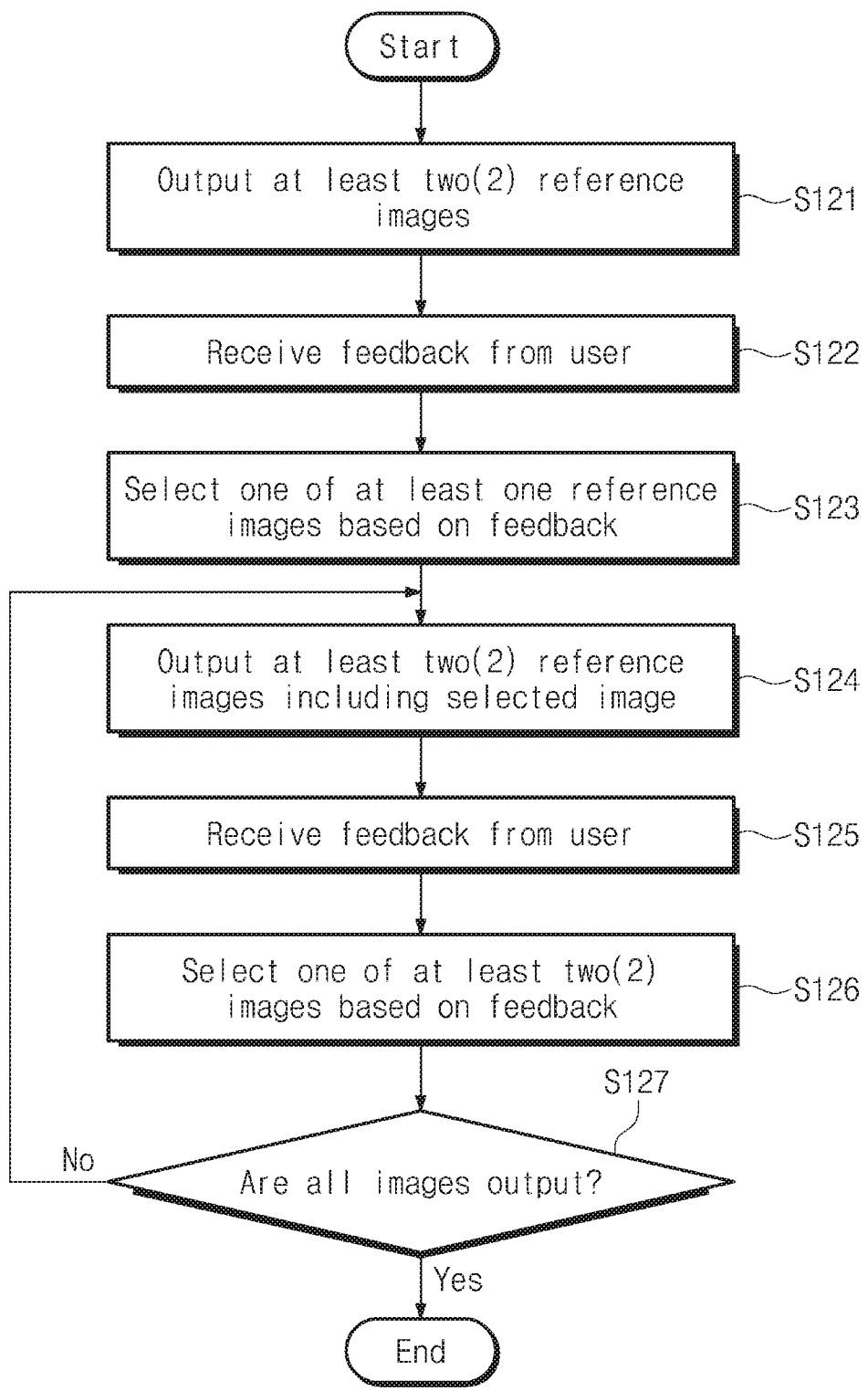
FIG. 7 is a flowchart illustrating a preference training unit of FIG. 5 according to an exemplary embodiment of the present inventive concept.

FIG. 7 is a flowchart illustrating a preference training unit of FIG. 5. Operations of S121 to S127 illustrated in FIG. 7 indicate a preference training and may be included in the operation of S100 of FIG. 4.

In operation S121, the preference training unit 111B may output at least two reference images. The preset unit 111C described with reference to FIG. 5 may include preset information about a plurality of reference images to be used in a preference training. The preference training unit 111B may select at least two images of the reference images based on the preset information. The preference training unit 111B may output one of the at least two images through the display device 130 depending on feedback from the user 500.

Each of the reference images may be images generated based on different parameters and stored in the preset unit 111C. For example, first and second reference images may have different luminance, first and third reference parameters may have different contrast, and second and third reference parameters may have different light and shade. However, the present inventive concept is not limited thereto, and parameters of each of the reference images may be variously changed.

In operation S122, the preference training unit 111B may receive the feedback from the user 500. For example, the user 500 may select one image of the at least two images being output through the display device 130 and may provide feedback with respect to the selected image to the preference training unit 111B through the input device 150 of FIG. 1.

The image selected by the user 500 may be an image having parameter values preferred by the user among the at least two images. For example, it is assumed that a first image and a second image, brighter than the first image, are output through the display device 130. If the user 500 prefer the brighter image, the user may select the second image.

In operation S123, the preference training unit 111B may select a reference image based on the feedback. For example, the feedback may include information about an image preferred by the user. The preference training unit 111B may select one reference image based on the feedback from the at least two reference images provided through the display device 130.

In operation S124, the preference training unit 111B may output at least two reference images. The at least two reference images may include the reference image selected in the operation S123 and one of the plurality of reference images not provided in the operation S121.

In operation S125, the preference training unit 111B may receive feedback from the user. In an operation S126, the preference training unit 111B may select one reference image based on the feedback. Since operations of S125 and S126 are similar to the operations of S122 and S123, a description thereof is omitted.

In operation S127, the preference training unit 111B may determine whether all reference images are output. In the case where all reference images are not output, the preference training unit 111B may repeatedly perform the operations of S124 through S126. In the case where all reference images are output, the preference training unit 111B may finish the preference training.

Information about the reference images selected in the preference training may be provided to the PHVS generating unit 111D.

The preference training may be performed on each of the plurality of users. Parameters to be set or information about parameters may be stored in the memory device 140 or in a separate storage device. In the case where the user 500 changes, the stored information may be automatically or manually loaded again, and thereby may be used in a video coding without an additional sensitivity training.

The preference training may be performed in each of various operation environments (e.g., indoor, outdoor, day, night, etc.). The parameters which are set or information about the parameters may be stored in the memory device 140 or in a separate storage device. In the case where the operation environment changes, the stored information may be automatically or manually loaded again and thereby may be used in a video coding without an additional sensitivity training.

The sensitivity training and the preference training described with reference to FIGS. 6 and 7 may be performed during an initial setting operation of the user device 100. The sensitivity training and the preference training may be performed according to a request of the user while the user device 100 operates. The sensitivity training and the preference training may be performed during a background operation of the user device 100. The sensitivity training and the preference training may be performed by an operation such as a parameter change of the user 500 while the user device 100 outputs an image.

According to an exemplary embodiment, the training unit 111 may collect information about the sensitivities and the preferences of the user by performing a sensitivity training and a preference training with the user 500. The training unit 111 may generate a personal video parameter PVP based on the collected information. The personal video parameter PVP may be based on a personal human vision system (PHVS) model. The personal video parameter PVP may be used in an encoding of an image IMG or a decoding of an encoded image. Thus, an encoding of the image IMG and a decoding of the encoded image are performed based on preference of a personal user, and thus a user experience with respect to the user device 100 may be optimized for the user.

Figure 8:
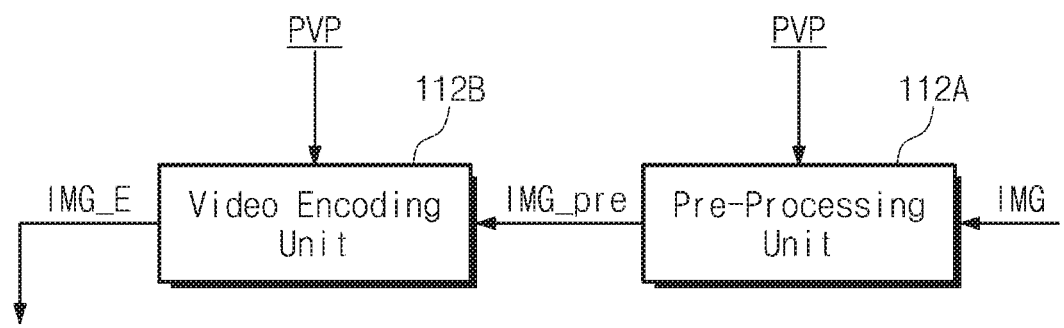
FIG. 8 is a block diagram illustrating a video encoder of FIG. 1 according to an exemplary embodiment of the present inventive concept.

FIG. 8 is a block diagram illustrating the video encoder of FIG. 1. Referring to FIGS. 1 and 8, the video encoder 112 may include a pre-processing unit 112A and a video encoding unit 112B.

The pre-processing unit 112A may preprocess or perform a pre-processing operation on the image IMG based on the personal video parameter PVP to generate a pre-processed image IMG_pre. As described above, the personal video parameter PVP may include sensitivity information and preference information about the image IMG of the user 500. In the case where the user 500 is sensitive to a brighter image, the pre-processing unit 112A may increase luminance of the image IMG. In the case where the user 500 prefers a clearer image, the pre-processing unit 112A may attenuate a high frequency domain of the image IMG through a digital signal processing operation, such as a high-pass filtering, and may increase contrast. In the case where the user 500 prefers a softer image, the pre-processing unit 112A may attenuate a high frequency domain of the image IMG through a digital signal processing operation such as a low-pass filtering.

The pre-processed image IMG_pre may be an image processed based on the sensitivities and the preferences of the user 500 according to the personal video parameter PVP. The pre-processed image IMG_pre may be provided to the video encoding unit 112B. The operation of the pre-processing unit 112A is merely an example and the scope of the inventive concept is not limited thereto.

The video encoding unit 112B may encode the pre-processed image IMG_pre to generate the encoded image IMG_E based on the predetermined coding algorithm. For example, the video encoding unit 112B may encode the pre-processed image IMG_pre based on a perceptual video coding (PVD) algorithm. The perceptual video coding (PVD) indicates an algorithm of compressing an image by removing factors that do not affect perception of the user based on human perceptual ability.

The video encoding unit 112B may encode the pre-processed image IMG_pre based on, or using, the personal video parameter PVP received from the training unit 111. For example, as described above, the personal video parameter PVP may include sensitivity information and preference information of the user 500. The video encoding unit 112B may receive the personal video parameter PVP that includes a value of a parameter which the user prefers or a value of a parameter to which the user responds. The video encoding unit 112B may compress the pre-processed image IMG_pre by removing factors that do not affect perception of the user based on the responded parameter or the responded parameter value. The encoded image IMG_E may be stored in the memory device 140.

If the user 500 responds to a clear image, the video encoding unit 112B may increase a bit rate of blocks having a great change (i.e., improve image quality) by allocating a small quantum parameter (QP) to the blocks having a great change among blocks of the image IMG and may allocate a relatively great quantum parameter to other blocks (i.e., blocks having a small change). If the user 500 responds to a softer image, the video encoding unit 112B may increase a bit rate of blocks having a great change (i.e., improve image quality) by allocating a small quantum parameter (QP) to the blocks having a small change among blocks of the image IMG and may allocate a relatively great quantum parameter to other blocks (i.e., blocks having a great change).

A video coding algorithm of the video encoding unit 112B is merely an example and the scope of the inventive concept is not limited thereto.

Figure 9:
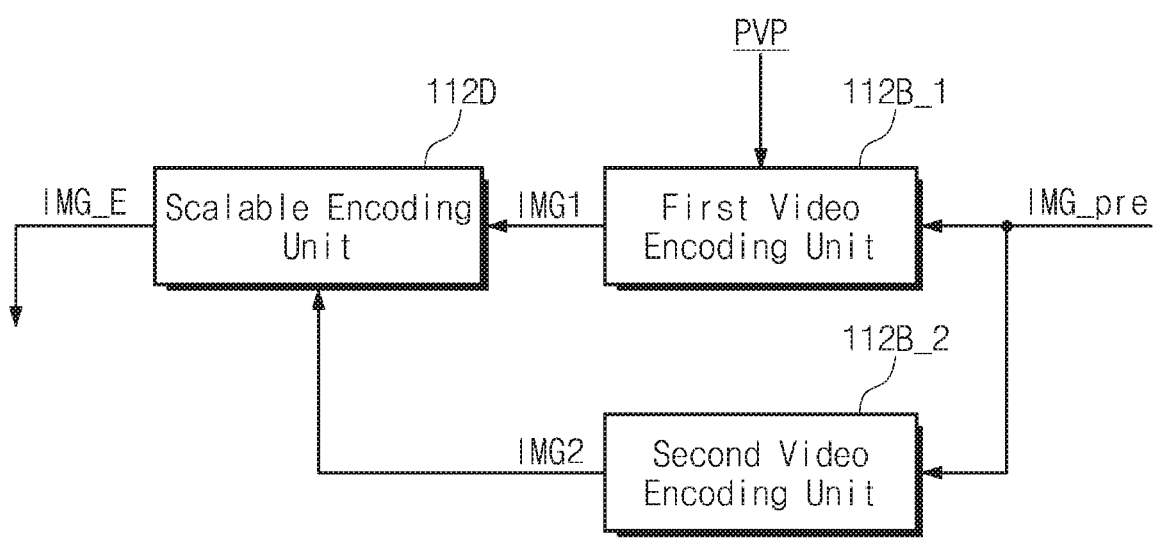
FIG. 9 is a block diagram illustrating a video encoding unit of FIG. 8 according to an exemplary embodiment of the present inventive concept.

FIG. 9 is a block diagram illustrating an example of a video encoding unit of FIG. 8. Referring to FIG. 9, the video encoding unit 112B is described according to an exemplary embodiment of the present inventive concept, but the present inventive concept is not limited thereto.

Referring to FIGS. 8 and 9, the video encoding unit 112B may include a first encoding unit 112B_1, a second encoding unit 112B_2, and a SVC encoding unit 112D. The term of "SVC" is short for "scalable video coding." The video encoding unit 112B may encode the pre-processed image IMG_pre based on a scalable video coding (SVC) algorithm.

The scalable video coding (SVC) algorithm indicates a coding algorithm that generates images having different characteristics such as resolution, image quality, a frame rate, luminance, color contrast, a color temperature, color saturation, and a bit rate as one video stream. The first video encoding unit 112B_1 may encode the pre-processed image IMG_pre based on the personal video parameter PVP to generate a first image IMG1. The second video encoding unit 112B_2 may encode the pre-processed image IMG_pre based on the conventional HVS model to generate a second image IMG2.

The first image IMG1 indicates an image compressed according to the sensitivity information and preference information of the user 500, and the second image IMG2 indicates an image compressed according to the HVS model corresponding to an average value of the sensitivities and the preferences of a plurality of users.

The SVC encoding unit 112D may generate an encoding image IMG_E by setting the second image IMG2 as a basic layer and setting the first image IMG1 as an expansion layer.

When decoding the encoded image IMG_E, the first image IMG1 or the second image IMG2 may be selected to be decoded.

The scalable video coding (SVC) performed by the video encoding unit 112B is an exemplary embodiment and the scope of the inventive concept is not limited thereto. The video encoding unit 112B may be embodied based on various video coding algorithms.

Figure 10:
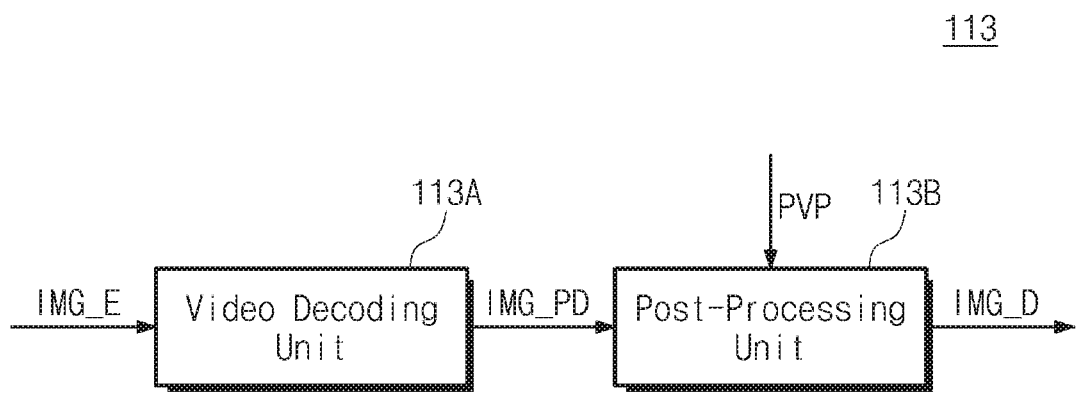
FIG. 10 is a block diagram illustrating a video decoder of FIG. 1 according to an exemplary embodiment of the present inventive concept.

FIG. 10 is a block diagram illustrating the video decoder of FIG. 1. Referring to FIGS. 1 and 10, the video decoder 113 may include a video decoding unit 113A and a post-processing unit 113B.

The video decoding unit 113A may decode the encoded image IMG_E based on a predetermined video coding algorithm to generate a preliminary decoded image IMG_PD. The video decoding unit 113A may decode the encoded image IMG_E based on the video coding algorithm corresponding to the video encoding unit 112B. For example, as described with reference to FIGS. 8 and 9, if the encoded image IMG_E is an image encoded based on the scalable video coding algorithm, the video decoding unit 113A may perform a decoding operation to output one of a plurality of layers included in the encoded image IMG_E based on the scalable video coding algorithm.

The post-processing unit 113B may perform a post-processing operation on the preliminary decoded image IMG_PD generated from the video decoding unit 113A. For example, the post-processing unit 113B may be configured to post-process the preliminary decoded image IMG_PD generated from the video decoding unit 113A, based on the personal video parameter PVP from the training unit 111, to output the decoded image IMG_D. As described above, the personal video parameter PVP may include information about the sensitivities and the preferences of the user 500 of FIG. 1 with respect to the image IMG. If the user 500 may respond to a brighter image and prefer a blurrier image, the post-processing unit 113B may increase luminance of the preliminary decoded image IMG_PD and lower clarity of the preliminary decoded image IMG_PD through a digital signal processing operation. For example, the decoded image IMG_D output from the post-processing unit 113B may be an image in which the sensitivities and the preferences of the user 500 is reflected. An operation of the post-processing unit 113B may be selectively performed depending on whether the encoded image IMG_E reflects the sensitivities and the preferences of the user.

As described above, the personal video coding module 110 may collect sensitivity information and preference information with respect to the personal user through a training operation with the user and may encode or decode the image IMG based on the collected information. Thus, user device 100 may provide an optimized image to the personal user.

Figure 11:
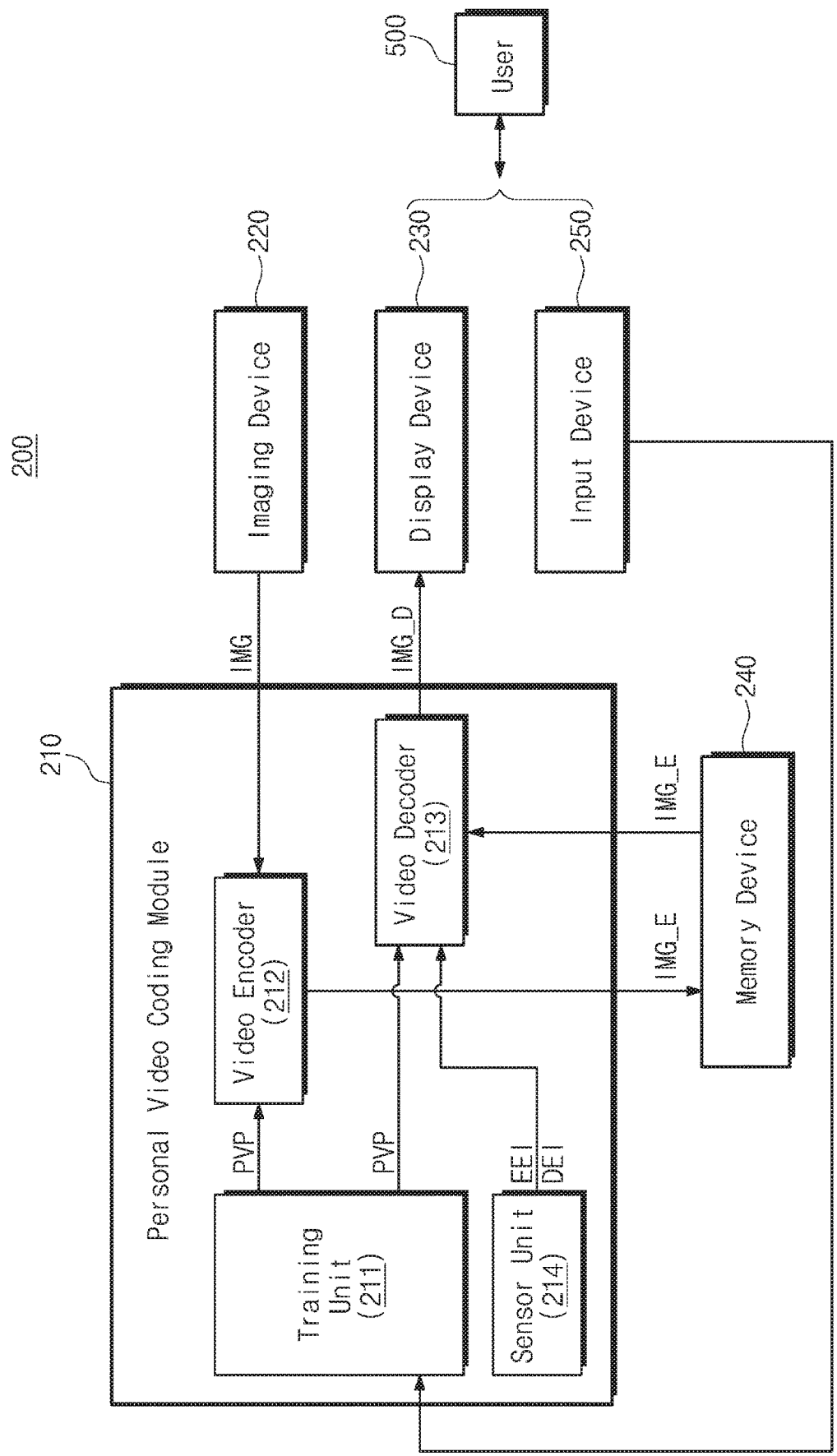
FIG. 11 is a block diagram illustrating a user device according to an exemplary embodiment of the present inventive concept.

FIG. 11 is a block diagram illustrating a user device according to an exemplary embodiment of the present inventive concept. Referring to FIG. 11, a user device 200 may include a personal video coding module 210, an imaging device 220, a display device 230, a memory device 240, and an input device 250. The personal video coding module 210 may include a training unit 211, a video encoder 212, a video decoder 213, and a sensor unit 214. Since the personal video coding module 210, the imaging device 220, the display device 230, the memory device 240, the input device 250, the training unit 211, the video encoder 212, and the video decoder 213 are equivalent to those elements described with reference to FIGS. 1 through 10, a detailed description thereof is omitted.

The personal video coding module 210 may further include the sensor unit 214. The sensor unit 214 may be configured to collect an operation environment information of the user device 200. The sensor unit 214 may include a plurality of sensors configured to collect an operation environment information of the user device 200, such as illumination intensity information, proximity information, peripheral color temperature information, display luminance information, etc. The sensor unit 214 may be located outside the personal video coding module 210.

While the training unit 211 performs a sensitivity training or preference training, the sensor unit 214 may collect the operation environment information. The operation environment information, collected while the sensitivity training or the preference training is performed, is called an encoding environmental information (EEI).

While the video decoder 213 performs a decoding operation, the sensor unit 214 may collect the operation environment information. The operation environment information collected during the decoding operation of the video decoder 213 is called a decoding environment information (DEI).

The encoding environmental information EEI and the decoding environment information DEI may be provided to the video decoder 213. The video decoder 213 may compare the encoding environmental information EEI with the decoding environment information DEI to decode the encoded image IMG_E based on a comparison result. For example, the encoding environmental information EEI and the decoding environment information DEI may be different from each other. Environment information of when the sensitivity training or the preference training is performed may be different from environment information of when a decoding operation is performed (or an image is output). This may affect the sensitivities and the preferences of the user in an image output through the display device 230.

It is assumed that an ambient luminance in the training operation is a first luminance and an ambient luminance in the decoding operation is a second luminance, darker than the first luminance. The training unit 211 may generate the personal video parameter PVP through the training operation at the first luminance. The video encoder 212 may generate the encoded image IMG_E based on the personal video parameter PVP. The video decoder 213 may decode the encoded image IMG_E at the second luminance Since the second luminance in the decoding operation is darker than the first luminance in the training operation, an additional correction may be performed so that the user 500 may feel no luminance difference from the decoded image IMG_D due to such environment change between the learning operation and the decoding operation.

The video decoder 213 may correct a difference between an ambient environment in the training operation and an ambient environment in the decoding operation based on the encoding environmental information EEI and the decoding environment information DEI. Thus, the user 500 may be offered an image which the user himself prefers regardless of the ambient environment.

Figure 12:
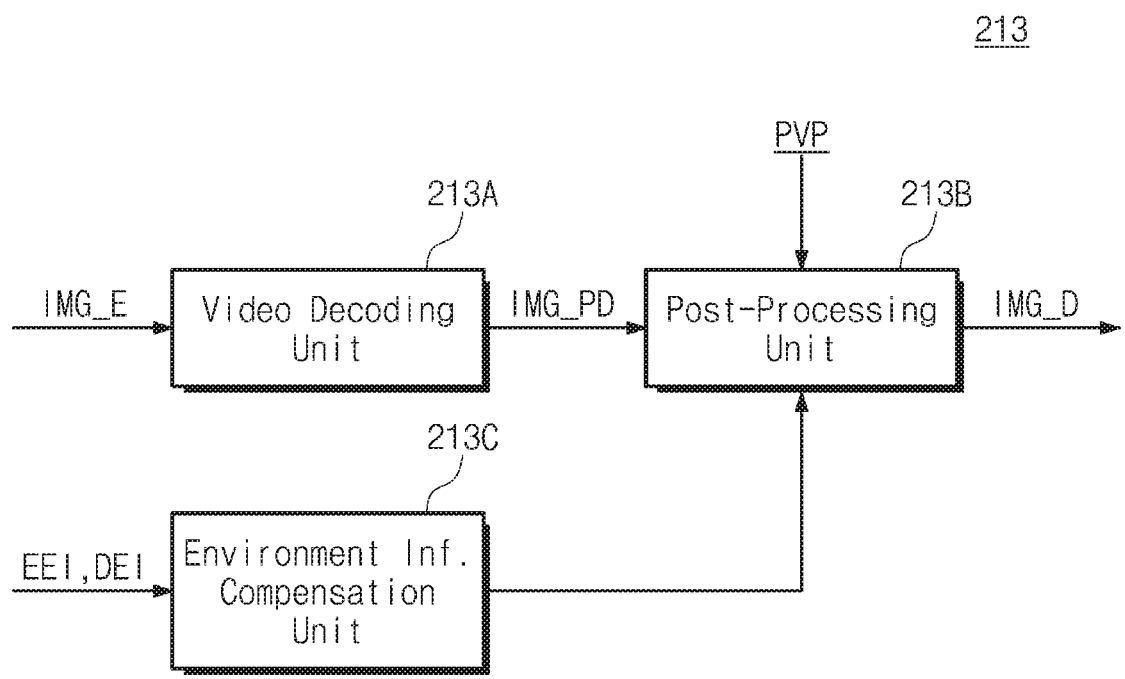
FIG. 12 is a block diagram illustrating a video decoder of FIG. 11 according to an exemplary embodiment of the present inventive concept.

FIG. 12 is a block diagram illustrating a video decoder of FIG. 11. Referring to FIGS. 11 and 12, the video decoder 213 may include a video decoding unit 213A, a post-processing unit 213B, and an environment information compensation unit 213C. Since the video decoding unit 213A and the post-processing unit 213B were described with reference to FIG. 10, a detailed description thereof is omitted.

The video decoding unit 213A may receive the encoded image IMG_E, decoding the encoded image IMG_E to generate a preliminary decoded image IMG_PD.

The video decoder 213 may further include the environment information compensation unit 213C. The environment information compensation unit 213C may receive the encoding environmental information EEI and the decoding environment information DEI. The environment information compensation unit 213C may compare the encoding environmental information EEI with the decoding environment information DEI to provide a comparison result to the post-processing unit 213B. The environment information compensation unit 213C may provide a comparison result to the post-processing unit 213B. For example, the comparison result may include information on whether the ambient luminance of the training operation is brighter than the ambient luminance of the decoding operation.

The post-processing unit 213B may post-process the preliminary decoded image IMG_PD received from the video decoding unit 213A based on or using the personal video parameter PVP received from the training unit 211 and the comparison result received from the environment information compensation unit 213C. For example, the post-processing unit 213B may perform a post-processing operation on the preliminary decoded image IMG_PD based on, or using, the personal video parameter PVP as described with reference to FIG. 10 and the comparison result received from the environment information compensation unit 213C.

The post-processing unit 213B may perform a post-processing operation based on, or using, the comparison result received from the environment information compensation unit 213C. If the comparison result indicates that the luminance information of the encoding environmental information EEI is brighter than the luminance information of the decoding environmental information DEI, the post-processing unit 213B may post-process the preliminary decoded image IMG_PD from the video decoding unit 213A so that the luminance of the decoded image IMG_D is reduced. The image from the video decoding unit 213A may be post-processed based on, or using, the comparison result from the environment information compensation unit 213C in addition to the sensitivities and the preferences of the user 500. Accordingly, the personal video coding module 210 may provide an optimized image to a user irrespective of change in ambient environment between the training operation and the decoding operation.

Figure 13:
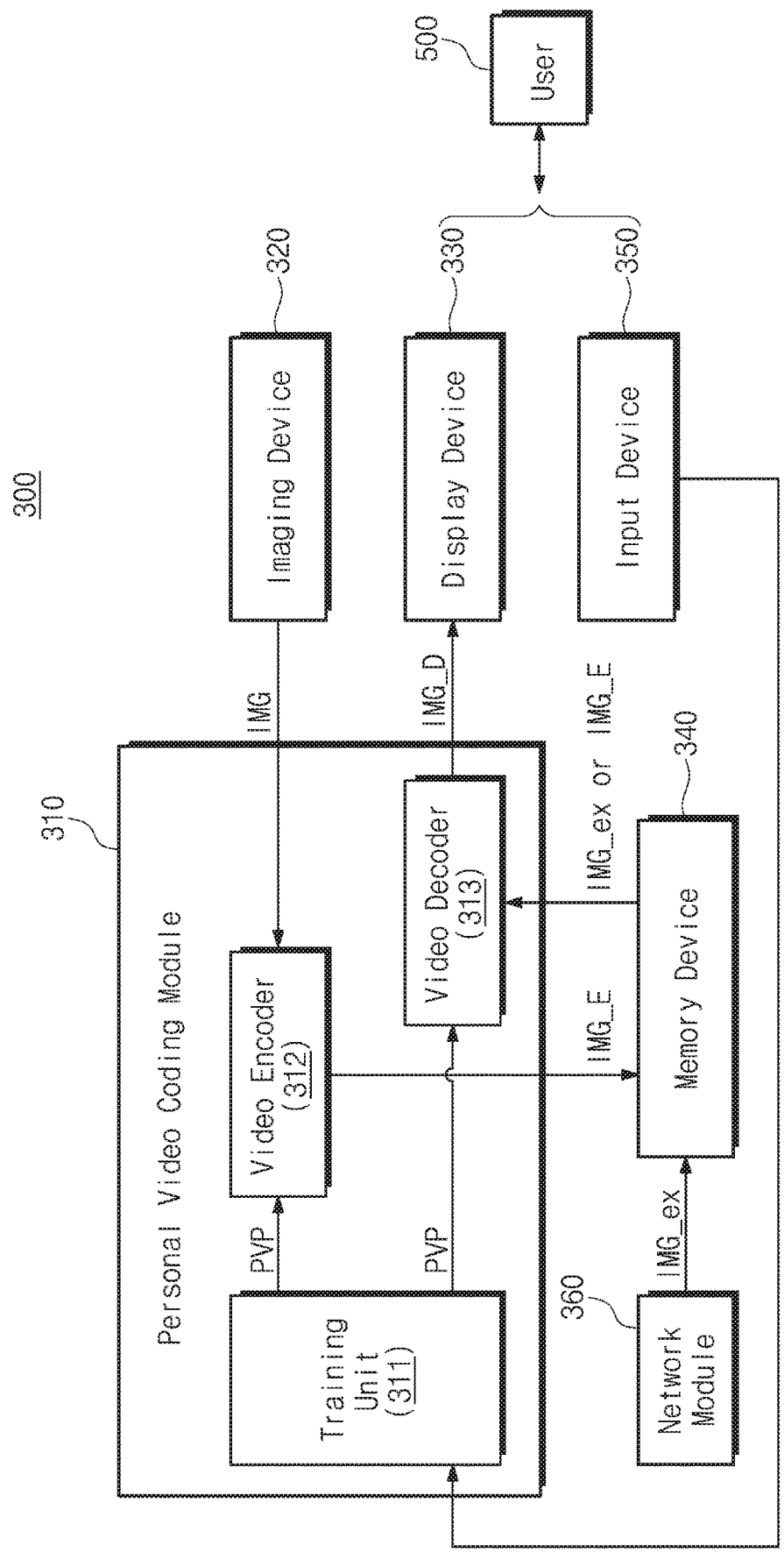
FIG. 13 is a block diagram illustrating a user device according to according to an exemplary embodiment of the present inventive concept.

FIG. 13 is a block diagram illustrating a user device according to an exemplary embodiment of the present inventive concept. Referring to FIG. 13, a user device 300 may include a personal video coding module 310, an imaging device 320, a display device 330, a memory device 340, an input device 350, and a network module 360. The personal video coding module 310 may include a training unit 311, a video encoder 312, and a video decoder 313. Since the personal video coding module 310, the imaging device 320, the display device 330, the memory device 340, the input device 350, the training unit 311, the video encoder 312, and the video decoder 313 are as described with reference to FIGS. 1 through 12, a detailed description thereof is omitted.

The user device 300 of FIG. 13 may further include a network module 360. The network module 360 may be configured to communicate with the outside through a wired or wireless communication network. Through the network module 360, the user device 300 may receive an external image IMG_ex from an external device (e.g., a server or other user device) in a streaming method or a download method. The received external image IMG_ex may be stored in the memory device 340.

The video decoder 313 may be configured to decode the external image IMG_ex or the encoded image IMG_E. For example, the video decoder 313 decodes the encoded image IMG_E. In this case, the encoded image (IMG_E) may be an image in which sensitivity and preference of the user are reflected by the video encoder 312. Thus, although the video decoder 313 does not perform a separate post-processing operation, the decoded image (IMG_D) may reflect the sensitivity and the preference of the user.

The video decoder 313 decodes the external image IMG_ex. Since the external image (IMG_ex) is an image provided from an external device through the network module 350, it may be an image in which sensitivity and preference of the user are not reflected. In this case, the video decoder 313 may perform a post-processing operation on the external image IMG_ex based on the personal video parameter PVP so that the decoded image (IMG_D) reflects sensitivity and preference of the user.

Although FIG. 13 illustrates that the external image IMG_ex is provided through the network module 360, the present inventive concept is not limited thereto. The external image IMG_ex may be provided through a separate storage medium such as a memory card, a memory stick, etc.

Figure 14:
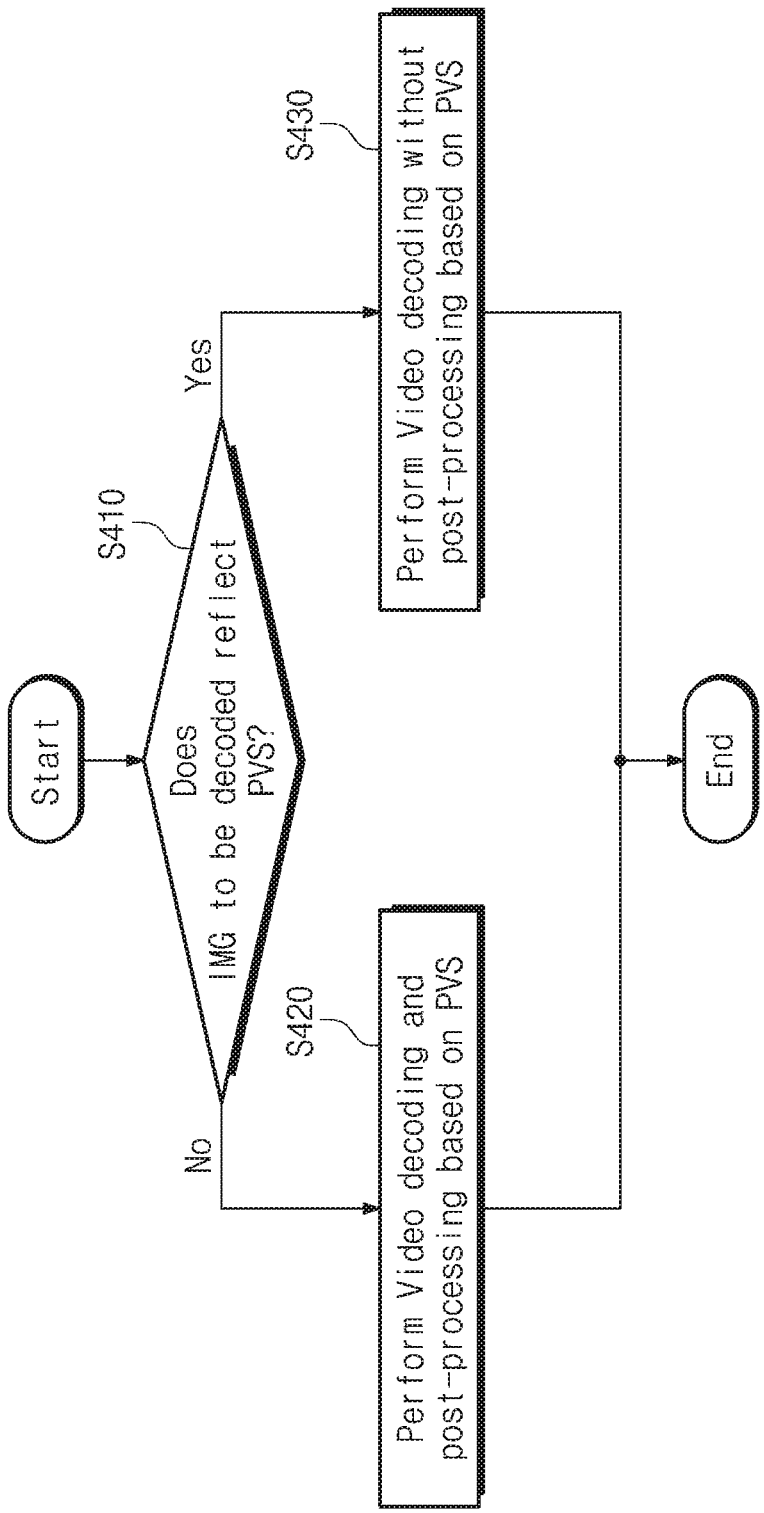
FIG. 14 is a flowchart illustrating an operation of a video decoder of FIG. 13 according to an exemplary embodiment of the present inventive concept.

FIG. 14 is a flowchart illustrating an operation of a video decoder of FIG. 13. Referring to FIGS. 13 and 14, in operation S410, the video decoder 313 may determine whether an image to be decoded reflects the personal video parameter PVP. For example, as described above, the encoded image IMG_E from the video encoder 312 reflects the sensitivities and the preferences (i.e., PVP) of the user and the external image from the external device does not reflect the sensitivities and the preferences (i.e., PVP) of the user.

If an image to be decoded does not reflect the sensitivities and the preferences (i.e., PVP) of the user (i.e., the image to be decoded is the external image IMG_ex), in operation S420, the video decoder 413 may perform a video decoding operation and a post-processing operation based on the PVP. Since the video decoding operation and the post-processing operation based on the PVP were described with reference to FIGS. 8 and 12, a detailed description thereof is omitted.

If an image to be decoded reflect the sensitivities and the preferences (i.e., PVP) of the user (i.e., the image to be decoded is the encoded image IMG_E, in operation S430, the video decoder 413 may perform a video decoding operation without a post-processing operation based on the PVP. Since the video decoding operation and the post-processing operation based on the PVP were described with reference to FIGS. 8 and 12, a detailed description thereof is omitted.

As described with reference to FIGS. 11 and 12, if the encoding environmental information EEI is different from the decoding environmental information DEI, the video decoder 413 does not perform the post-processing operation based on the PVP, but may perform the post-processing operation based on the comparison result of the environment information compensation unit 213C.

According to an exemplary embodiment of the present inventive concept, the personal video coding module may collect sensitivity and preference information of the personal user through the sensitivity training and the preference training with the user. The personal video coding module may encode or decode an image based on the collected sensitivity and preference information. Thus, unlike a video coding module using a conventional HVS model based on an average value of the sensitivities and the preferences of multiple users, the personal video coding module of the inventive concept may provide an image optimized to a personal user. Thus, a user device may provide an optimized image to the user.

Figure 15:
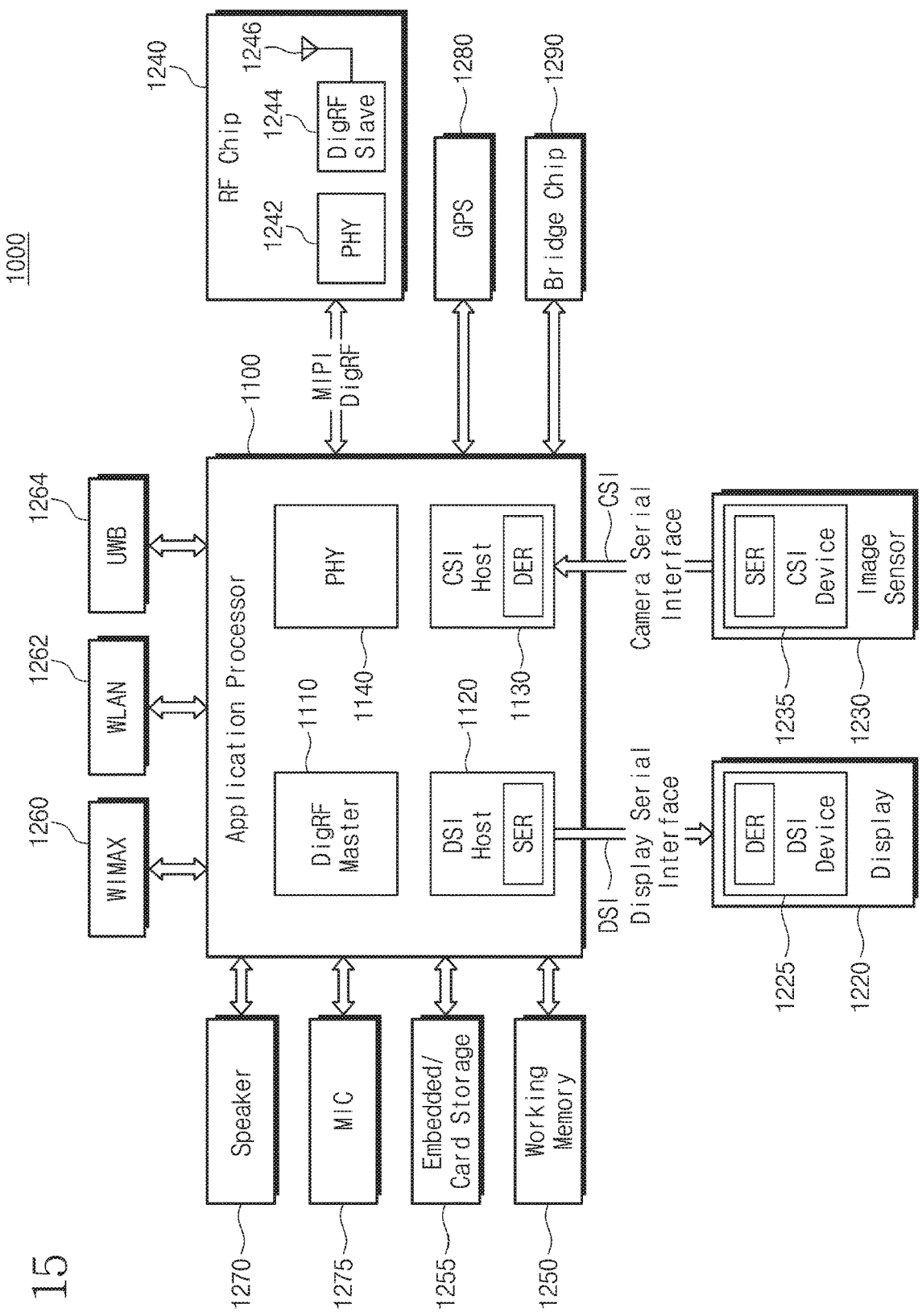
FIG. 15 is a block diagram illustrating an electronic system including a personal video coding module according to according to an exemplary embodiment of the present inventive concept.

FIG. 15 is a block diagram illustrating an electronic system including a personal video coding module according to an exemplary embodiment of the inventive concept. Referring to FIG. 15, an electronic system 1000 may be embodied in the form of a personal electronic device such as a personal digital assistant (PDA), a portable media player (PMP), a smart phone, or a wearable device.

The electronic system 1000 may include an application processor 1100, a display device 1220, and an image sensor 1230. The application processor 1100 may include a DigRF master 1110, a DSI host 1120, a CSI host 1130, and a physical layer 1140. The term of "CSI" is short for "camera serial interface." The term of "DSI" is short for "display serial interface." The term of "DigRF" is short for "digital radio frequency."

Although not illustrated in the drawing, the application processor 1100 may include a personal video coding module described with reference to FIGS. 1 through 14 or a part thereof. Constituent elements included in the application processor 1100 may be provided in the form of intellectual property (IP). The application processor 1100 may include a high-speed memory for storing information or data (e.g., PVP, preset information, etc.) used in the personal video coding module described with reference to FIGS. 11 through 14 or in a part thereof.

The DSI host 1120 may communicate with a DSI device 1225 through a display serial interface DSI. An optical serializer SER may be embodied in the DSI host 1120. For example, an optical deserializer DER may be embodied in the DSI device 1225. The display device 1220 may be the display device described with reference to FIGS. 1 through 14 and may be configured to provide an image IMG to the user. The display device 1220 may include a touch sensor, and the user may provide feedback to the personal video coding module described with reference to FIGS. 1 through 14 through the touch sensor.

The CSI host 1130 may communicate with a CSI device 1235 of the image sensor 1230 through a camera serial interface CSI. An optical deserializer DER may be embodied in the CSI host 1130. An optical serializer SER may be embodied in the CSI device 1235. The image sensor 1230 may be the imaging device described with reference to FIGS. 1 through 14.

The electronic system 1000 may further include a RF (radio frequency) chip 1240 that communicates with the application processor 1100. The RF (radio frequency) chip 1240 may include a physical layer 1242, a DigRF slave 1244, and an antenna 1246. The physical layer 1242 of the RF (radio frequency) chip 1240 may exchange data with the physical layer 1140 of the application processor 1100 by a MIPI DigRF interface.

The electronic system 1000 may further include a working memory 1250 and an embedded/card storage 1255. The working memory 1250 and the embedded/card storage 1255 may store data provided from the application processor 1100. The working memory 1250 and the embedded/card storage 1255 may provide the stored data to the application processor 1100.

The working memory 1250 may temporarily store data processed or to be processed by the application processor 1100. The working memory 1250 may include a volatile memory such as SRAM, DRAM, SDRAM, etc., or a nonvolatile memory such as PRAM, MRAM, ReRAM, FRAM, etc. The embedded/card storage 1255 may store data regardless of whether power is supplied or not. The working memory 1250 and the embedded/card storage 1255 may be memory devices described with reference to FIGS. 1 through 14.

The electronic system 1000 may communicate with an external system through WIMAX (world interoperability for microwave access) 1260, WLAN (wireless local area network) 1262, UWB (ultra-wideband) 1264, etc.

The electronic system 1000 may further include a speaker 1270 and a microphone 1275 for processing voice information. The user may provide feedback to the personal video coding module described with reference to FIGS. 1 through 14 through the speaker 1270 and the microphone 1275. The electronic system 1000 may further include a GPS (global positioning system) device 1280 for processing location information. The electronic system 1000 may further include a bridge chip 1290 for managing a connection to peripheral devices.

As described above, the personal video coding module according to an exemplary embodiment of the inventive concept may collect sensitivity information and preference information of a user through a sensitivity training and a preference training with the user, and may encode or decode an image based on the collected information. Thus, the personal video coding module may provide an optimized image to the user.

The user device according to the present inventive concept may perform a training operation on a personal user to collect sensitivity information and preference information, and may include a training unit that generates a personal video parameter based on the collected information.

Thus, since an image may be encoded or decoded such that the sensitivities and the preferences of the personal user with respect to the image are reflected, an optimized image may be provided to the personal user. Thus, a video coding module providing an improved user experience and a method of operating the same are provided.

While the present inventive concept has been shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. An operation method of a video coding module comprising:
  receiving user-specific sensitivity value and preference value from a user indicating personal viewing choices of the user, wherein the received user-specific sensitivity and preference values comprise a corresponding value provided by the user for at least one of a plurality of parameters, and wherein the plurality of parameters comprises:
    clarity, luminance, color contrast, a color temperature, color saturation, a bit rate, resolution, and a frame rate;
  performing a training operation on the video coding module by:
    gradually changing, with respect to a first preset image, a value of a parameter from the plurality of parameters to generate a plurality of test images, wherein each of the plurality of test images has a respective value of the parameter different from the value of the parameter of the first preset image, sequentially displaying the first preset image and each of the plurality of test images to the user, receiving a first feedback from the user with respect to the plurality of test images, and generating a personal video parameter based on the user-specific sensitivity and preference values received in the first feedback, wherein the user-specific sensitivity and preference values comprise the respective value of the parameter for each of the plurality of test images as provided in the first feedback from the user;

receiving a non-test image through an imaging device;

encoding the non-test image based on the personal video parameter to generate an encoded image; and decoding the encoded image based on the personal video parameter to generate a first decoded image.

2. The operation method of claim 1, wherein the performing of the training operation further comprises:

selecting one of the plurality of parameters with respect to the non-test image;

generating a test value of the selected one of the plurality of parameters;

outputting a second preset image to a display device associated with the user, wherein the second preset image is adjusted based on the test value of the selected one of the plurality of parameters;

receiving a second feedback from the user regarding the second preset image; and storing the following as the user-specific sensitivity and preference values:

selected one of the plurality of parameters, and the test value as the corresponding value of the selected one of the plurality of parameters.

3. The operation method of claim 1, wherein the performing of the training operation further comprises:

outputting at least two reference images among a plurality of reference images to a display device associated with the user;

receiving a second feedback from the user that one of the at least two reference images is selected; and selecting the one of the at least two reference images in response to the second feedback, wherein the user-specific sensitivity and preference values comprise the corresponding value for at least one of the plurality of parameters of the selected one of the at least two reference images as provided in the second feedback from the user.

4. The operation method of claim 1, wherein the encoding of the non-test image comprises:

performing a pre-processing operation on the non-test image using the personal video parameter to generate a pre-processed image; and encoding the pre-processed image according to a predetermined coding algorithm based on the personal video parameter to generate the encoded image, wherein the performing of the pre-processing operation includes adjusting the non-test image based on the personal video parameter.

5. The operation method of claim 4, wherein the predetermined coding algorithm comprises a perceptual video coding (PVC), H. 261, H. 262, H. 263, H.264/MPEG-4 AVC (advanced video coding), H265, a multi-view video coding, or a SVC (scalable video coding).

6. The operation method of claim 4, wherein the encoding of the pre-processed image comprises:

performing a first encoding operation on the pre-processed image based on the personal video parameter to generate a first image;

performing a second encoding operation on the pre-processed image based on an average HVS (human vision system) model to generate a second image; and performing a scalable encoding operation using the first image and the second image to generate the encoded image.

7. The operation method of claim 1, wherein the decoding of the encoded image comprises:

decoding the encoded image according to a predetermined coding algorithm to generate a preliminary decoded image; and post-processing the preliminary decoded image based on the personal video parameter to generate the first decoded image, wherein the post-processing of the preliminary decoded image includes adjusting the preliminary decoded image based on the personal video parameter to generate the first decoded image.

8. The operation method of claim 1, further comprising:

collecting an encoding environmental information during the performing of the training operation; and collecting a decoding environmental information during the decoding of the encoded image, wherein the encoding environmental information and the decoding environmental information each includes illumination intensity information, proximity information, peripheral color temperature information, or display luminance information.

9. The operation method of claim 8, wherein the decoding of the encoded image comprises:

decoding the encoded image according to a predetermined coding algorithm to generate a preliminary decoded image;

comparing the encoding environmental information with the decoding environmental information to generate a comparison result; and post-processing the preliminary decoded image based on the comparison result and the personal video parameter to generate the first decoded image, and wherein the post-processing of the preliminary decoded image includes adjusting the preliminary decoded image based on the comparison result and the personal video parameter to generate the first decoded image.

10. The operation method of claim 1, further comprising:

receiving an external image through a network module, and decoding the external image using the personal video parameter to generate a second decoded image.

11. The operation method of claim 10, wherein the decoding of the external image comprises performing a post-processing operation on the external image based on the personal video parameter.

12. A video coding module comprising:

a training unit configured to collect user-specific sensitivity value and preference value from a user indicating personal viewing choices of the user and generate a personal video parameter based on the collected user-specific sensitivity and preference values, wherein the collected user-specific sensitivity and preference values comprise a corresponding value provided by the user for at least one of a plurality of parameters, wherein the personal video parameter comprises the corresponding value provided by the user for the at least one of the plurality of parameters, and wherein the plurality of parameters comprises:
clarity, luminance, color contrast, a color temperature, color saturation, a bit rate, resolution, and a frame rate,
wherein the training unit is configured to perform the following to generate the personal video parameter:
gradually change, with respect to a preset image, a value of a parameter from the plurality of parameters to generate a plurality of test images, wherein each of the plurality of test images has a respective value of the parameter different from the value of the parameter of the preset image,
sequentially display the preset image and each of the plurality of test images to the user,
receive a feedback from the user with respect to the plurality of test images, and
generate the personal video parameter based on the user-specific sensitivity and preference values received in the feedback, wherein the user-specific sensitivity and preference values comprise the respective value of the parameter for each of the plurality of test images as provided in the feedback from the user;

an imaging device generating a non-test image;
a video encoder configured to encode the non-test image based on the personal video parameter and generate an encoded image; and
a video decoder configured to decode the encoded image based on the personal video parameter and generate a decoded image.

13. The video coding module of claim 12, wherein the training unit comprises:
a preset unit configured to store preset information including the plurality of parameters and a plurality of reference images;
a sensitivity training unit configured to collect the user-specific sensitivity value from the user based on the plurality of parameters of the preset information;
a preference training unit configured to collect the user-specific preference value from the user based on the plurality of reference images of the preset information; and
a personal human vision system (PHVS) generating unit configured to generate the personal video parameter based on the collected user-specific sensitivity and preference values.

* * * * *